US006978422B1

(12) United States Patent
Bushe et al.

(10) Patent No.: US 6,978,422 B1
(45) Date of Patent: Dec. 20, 2005

(54) METHODS AND APPARATUS FOR DISPLAYING MANAGED RESOURCE INFORMATION

(75) Inventors: Michael Patrick Bushe, Hopkinton, MA (US); Morrie Gasser, Hopkinton, MA (US); David Barta, West Roxbury, MA (US)

(73) Assignee: EMC Corporation, Hopkinton, MA (US)

( * ) Notice: Subject to any disclaimer, the term of this patent is extended or adjusted under 35 U.S.C. 154(b) by 555 days.

(21) Appl. No.: 09/966,878

(22) Filed: Sep. 28, 2001

(51) Int. Cl.[7] ............................ G06F 3/00; G06F 9/00; G06F 17/00

(52) U.S. Cl. ...................... 715/734; 715/736; 715/735; 709/223

(58) Field of Search ................................ 345/700, 734, 345/735, 736, 969; 709/223, 224

(56) References Cited

U.S. PATENT DOCUMENTS 6,275,225 B1 * 8/2001 Rangarajan et al. ........ 345/700
2002/0198973 A1 * 12/2002 Besaw ........................ 709/223
2003/0009543 A1 * 1/2003 Gupta ........................ 709/223
2003/0046381 A1 * 3/2003 Mokuya et al. ............. 709/223

OTHER PUBLICATIONS

Steinke, Steve. "Network and Systems Management with XML." http://www.networkmagazine.com/shared/article/showArticle.jhtml?=8702573. Oct. 10, 1999.*

* cited by examiner

*Primary Examiner*—Kristine Kincaid
*Assistant Examiner*—Boris Pesin
(74) *Attorney, Agent, or Firm*—Chapin & Huang, L.L.C.; Barry W. Chapin, Esq.

(57) ABSTRACT

Methods and apparatus operate in a computer system for managing resources and provide a method for displaying managed object data associated with managed resources. Embodiments of the invention retrieve a data dictionary containing a master view definition, task definitions, view definitions and managed object data definitions. The embodiments then display the master view definition on the graphical user interface and receive a managed object selection and a task selection to apply to the managed object selection. The embodiments then identify a view definition corresponding to the task selection with which to display managed object data related to the managed object selection. The embodiments then display a view corresponding to the at least one view definition on a graphical user interface of the computer system and obtain managed object data related to the managed object selection based upon managed object data references contained in the view definition. The embodiments then display the managed object data related to the managed object selection within the view on the graphical user interface of the computer system.

20 Claims, 6 Drawing Sheets

METHODS AND APPARATUS FOR DISPLAYING MANAGED RESOURCE INFORMATION

FIELD OF THE INVENTION

The present invention generally relates to computer and software systems that use a graphical user interface to display data, and more particularly, to systems and techniques which allow for graphical systems management of computer and storage system resources via the graphical user interface.

BACKGROUND OF THE INVENTION

Many types of conventional computing systems operate software programs that include a graphical user interface (GUI). The graphical user interface allows a user of such computing systems to graphically view, manage, control and/or configure various types of hardware and/or software resources in a computing system environment in which the computing system operates. The graphical user interface may allow, for example, a user of a computing system to interact with the computing system and its associated software applications, file systems, data, devices and/or peripherals. The computing system may operate in a networked computing environment and the software program providing the graphical user interface may be a network management application that allows a user to graphically and remotely manage, control or configure other computing systems or resources that are remotely coupled to each other via the network. Resources that may be graphically managed in this manner can include data storage system resources, host computer system resources, server computer system resources, network device resources or any other type of hardware or software resources.

Conventional graphical-based resource management software applications (e.g., network or device manager software programs) typically provide representations of each resource on the graphical user interface using icons or other graphical identifiers that represent the resources that the software application can manage. A software developer may implement a typical conventional resource management software application using a commercially available graphics application development package such as X-Windows, ActiveX, "Swing", Java or another such graphics software development platform to construct a program which renders the graphical user interface to provide the representations of manageable resources for access by the user. The software application can use or incorporate a number of software entities, sometimes called widgets, which define how each resource is to appear on the graphical user interface. The widgets for a particular resource may also define any method operations (e.g., systems management functions) that can be invoked upon the resource. A software developer can construct a management application as a collection of respective widgets which are instantiated for each resource that the application is to manage.

A simple yet widely known resource management software application is the Windows Explorer program that comes bundled with the Windows series of operating systems (e.g., Windows 95, 98, NT, 2000) manufactured by Microsoft Corporation of Redmond, Wash. In operation on a computer system, the Windows Explorer application can render icons on a graphical user interface of the computer that represent various resources that a user of the computer can manage via interaction with the Windows Explorer graphical user interface. Some icons might represent files or data stored on disk(s) in the computer system, while other icons might represent, for example, printers, software applications, network interfaces, or other resources or devices which a user can manage using the Windows Explorer graphical user interface. When a user uses an input device such as a mouse to select an icon that represents a resource, Windows Explorer might activate a widget method, subroutine, procedure or other logic to invoke or apply a resource management operation (e.g., a software function) upon the selected resource represented by the icon.

By way of example, suppose the user selects a printer icon within the Windows Explorer graphical user interface. The user may then activate a pull-down menu (e.g., using the mouse) that indicates various printer resource management functions which the user may invoke on the specific printer represented by the printer icon. Such functions may include a "set as default printer" function, a "clear/purge documents from printer function", or other functions commonly associated with printers. As another example, if the user selects a folder and double-clicks on the folder, the Windows Explorer application operates a function associated with a folder resource (i.e., associated with the specific folder which the user selected) in order to access a file system in the computer system to obtain a list of any resources such as files or subfolders (i.e., subdirectories) contained within the selected folder. Windows Explorer then displays the results of the "open folder" operation within the graphical user interface to allow the user to view the contents of the selected folder. To provide these functions, the Windows Explorer program (i.e. the software code) operates a set of pre-defined functions which carry out the processing operations necessary to access the required resource data and operates a set of pre-defined graphics routines that visually display the results of these pre-defined functions to the user on the graphical user interface.

Another technology related to the present invention is called XML, which stands for extensible Markup Language. Generally, XML is a set of rules for defining semantic tags that break a document into parts and that identify the different parts of the document. XML provides a meta-markup language that defines a syntax used to define one or more application-specific structured markup languages. An XML software developer can define a set of XML tags for a specific use or purpose. The tags can then be documented in a "document type definition" (DTD) or XML Schema. Publicly available document type definitions exist to describe vocabularies and syntax for various fields such as chemistry, physics, computers and many other fields. As an example, a document type definition for solid-state physics might include tag definitions that allow a user to provide data in a document for atoms, molecules, molecular bonds and so forth. As a specific example, an atom tag might define the structure of an atom by including fields or parameters that allow a user to define the number of protons, electrons, atomic weight, atomic symbol and so forth for a particular atom. In this manner, XML provides a way to define a generic structure for commonly known things (e.g., atoms in this example) and allows a user to supply data to the structure. Once populated with data, the XML structure can be transported and interpreted by other users or software applications that have access to the document type definition that contains the tag definitions for that structure. Continuing the example, a molecular science document type definition can be shared by many different people who wish to develop software applications in the molecular sciences field. This allows these applications to exchange and "understand" data in an XML document prepared using the proper tags for that document type definition. If the application understands the syntax defined by the document type definition, it automatically understands the languages built using the XML tags.

An XML document can contain a styles section that contains a set of tags that can contain information that defines how a computer system is to display or render data associated with the tags define in the document. For example, an XML document can contain an "atom style" that defines how the atom data associated with the atom tag or tags is to be rendered on a computer display.

A software developer can use an editor to create an XML document. Once created, the software developer can provide the XML document, or a number of XML documents, to a program known as an "XML parser" which reads the XML document(s) and verifies that the XML contained within the document is "well formed". In other words, the XML parser makes sure that the XML document adheres to the syntax and requirements of the document type definition for which that XML document is written. Once an XML document passes correctly through an XML parser, the XML parser can convert the document into a tree of elements, nodes or data structures collectively referred to as a document object model (DOM). A document object model is essentially a single hierarchical data structure that organizes the data associated with the XML tags in the document according to the document type definition. The XML parser can pass or otherwise provide the document object model or individual nodes or portions of the document object model to a software application. This may be done over a network between computer systems. The software application may be an end-user application such as a web browser that understands how to traverse and display the contents of the data in the document object model tree. For example, a browser can display data in a document object model tree to a user according to the styles that are defined in a styles section of the document object model tree.

In this manner, if a software application such as a browser receives a document containing XML tags configured according to a certain document type definition, the browser does not need to know in advance each and every tag that might be used by many different markup languages. Instead, the browser discovers the tags used in any given document as it reads and displays data referenced by the document in accordance with the document type definition. The detailed instructions about how to actually display the contents or data associated with tags (i.e., the tagged data) are provided in a separate style sheet which can be attached to the document and is included in the document object model tree. As an example, if a document contains XML tags which define various portions of data for a complex mathematical formula, a style sheet associated with this document and the document type definition can define how those tags are to be arranged on the graphical display such that the data for each piece of the formula appears properly arranged to the user. The document object model tree that the XML parser produces contains the references to the styles for the formula for the data and thus a browser can properly traverse the tree to access and display the formula data in a proper format.

SUMMARY OF THE INVENTION

Conventional techniques for representing and displaying managed resource data to a user of a resource management software application suffer from a number of deficiencies. By way of example, a resource management software application such as Windows Explorer is limited to displaying resource information concerning resources for which Windows Explorer has pre-programmed knowledge. If a new type of resource is introduced into a computing system environment and Windows Explorer attempts to access that resource for display and/or configuration (i.e., management) purposes, Windows Explorer may be unaware of how to properly represent and/or display the new resource. This is primarily because the Windows Explorer resource management application has been statically programmed to understand how to recognize and interact with certain types of predefined resources, and was unable to adapt in a flexible manner to the representation in management of new resources which are accessible by computer system. In other words, Windows Explorer can display and can manage resources such as files, directories, printers, network interfaces and a few other resources because Windows Explorer has been preprogrammed with management functions capable of properly controlling for configuring such resources. However, a new resource such as a new type of data storage system is introduced for access by computer system operating Windows Explorer, Windows Explorer may only be able to provide a graphical representation such as an icon which indicates that the resource exists but will be unable to access management functions which are specific to the new resource and will be unable to obtain and display data associated with the resource in different formats.

In addition, a user of the conventional resource management application such as Windows Explorer is unable to view resource data in a variety of different arrangements or views. For example, if a user selects a specific folder that represents a subdirectory in a file system in order to view the contents of a subdirectory, Windows Explorer is limited to displaying the contents of that subdirectory according to a predefined view of a subdirectory data. The view may include an icon for each file or directory within the subdirectory and may further include detailed information such as path information, creation date and size information related to resources within the selected subdirectory. The user is unable to modify the predefined views in order to create alternative configurations of Windows Explorer which can display such resource information in a variety of different formats. Again, such limitations are due primarily to the fact that conventional resource management application such as Windows Explorer are limited to preconceived data definitions and views that are statically defined at the time of the creation of the resource management application.

Conversely, the present invention defined the framework and software architecture that allows, for instance, the resource management application to displaying resource management information in a variety of different views according to selections of resources in resource management functions (tasks) which the user desires to apply to resources. In other words, embodiments of the invention provide a flexible solution to the dilemma of offering predefined views of resource data for resources selected for management by a user in a resource management application. Instead, using the techniques explained herein, the system of the invention is able to define the entire look and feel of the graphical user interface of the resource management application and allow the user to pick and choose which tasks or management functions are to be applied to which user selected resources. Based on the selections, the techniques of the invention employed a unique system for the selection of a specific view (or views) in which to represent the resource data produced as a result of applying a task to the selected resources. The flexible design offered by embodiments of the invention allows, for example, a developer or other user to create additional views or modify existing views for resource management data before, during and after release or creation of a resource management application employing techniques of the invention. Accordingly, as new resources are introduced into a computing system environment in which a resource management application configured according to embodiments of this invention operates, the resource management application can incorporate any additional or newly defined views which are to be applied when a user selects specific tasks to apply to specific resources for which the new view is appropriate to display resource data that results of the application of the task to the selected resources.

In particular, the system of the invention provides method embodiments which operate in a computer system comprising a memory system, a processor and a display that displays a graphical user interface for management of network resources. One such method embodiment displays managed object data associated with managed resources. To do so, the method retrieves a data dictionary containing a master view definition, task definitions, view definitions and managed object data definitions. The data dictionary may be a document object model based on a parsing operation performed on markup language documents, such as XML documents which define such task, managed object, and view definitions. The data dictionary further defines, for each task definition, at least one use case that defines a mapping of one or more view definitions one or more managed object data definitions.

Using the data dictionary, the method displays the master view definition (e.g., view application or view graphical user interface) defined in the data dictionary, on the graphical user interface of the computer system such that a user of the computer system can provide the at least one managed object selection and a task selection (one or more).

This method embodiment receives (e.g., via user input) at least one managed object selection and receives one or more task selections to apply to the managed object selection(s). A managed object selection can be, for example, a selectable icon on the graphical user interface which represents a manageable resource such as a software process or hardware device in a computing system environment in which the computer system operates. A task selection can be a selectable icon that represents a management function that can be applied to the manageable resource represented by the managed object selection.

Using the data dictionary, the method identifies at least one view definition corresponding to the task selection that defines a view with which to display managed object data related to the managed object selection. In one embodiment, the method consults the document object model in the data dictionary to traverse the data dictionary to find a task definition based on the user selected task selection. Then, using the user selected managed object selection, a use case that applies for this managed object is found in the data dictionary (e.g., based on the selected task). The use case specifies a view definition, also contained in the data dictionary, that defines a view to be displayed on the graphical user interface and also defines the managed object data that is to be displayed in the view.

The method then displays a view corresponding to the view definition on a graphical user interface of the computer system.

Then the method obtains the managed object data related to the at least one managed object selection. The managed object data obtained in this manner is the information or data that is to be displayed in the view that may be remotely obtained from a management server. In one embodiment, the method obtains the managed object data by invoking a management function associated with the task selection upon managed object data associated with at least one managed resource associated with the managed object selection(s) in order to produce managed object data. This resulting managed object data is referenced by managed object data references defined within the view for display purposes.

Once the managed object data is obtained (e.g., referenced from the data dictionary, from a management server, and/or produced as a result of applying the management function), the method then displays the managed object data related to the managed object selection (i.e., the managed object data referenced by the view definition) within the view on the graphical user interface of the computer system.

In preferred embodiments, the managed object data displayed in the view is related to the managed object selection because the user selects a task selection to apply to a managed object selection and therefore desires to see the results of how this task application affects the managed object data associated with managed resource(s) that correspond to the managed object selection(s). In other words, the user applies a task to a managed object representing a managed resource and sees the results in the view on the graphical user interface. However, a view definition can specify that any managed object data is to be displayed in the view which that view definition defines. As an example, a user may select a "CONFIGURE" task selection to be applied to a managed object selection that represents, for example, a "VOLUME" managed resource (e.g., a volume of data storage in a disk storage system). The combination of the task selection and managed object selection matches a use case in the data dictionary which references a view definition that is to be used to display the results of such a task application. The view defined in the view definition can then be displayed, and the view will reference certain managed object data that is to be shown in this view. This managed object data might be, for example, volume configuration information related to the volume that corresponds to the managed object selection provided by the user. In the step of obtaining the managed object data (prior to its display in the view), the method may invoke a configuration management function (corresponding to the task selection) upon the volume to configure the volume in some manner. The resulting data may be the managed object data that the view references for display within the view.

In this manner, the data dictionary can contain the definitions of tasks, managed objects (representing types of manageable resources in a computing system environment), and views which a resource management application can reference to present an interface to a user of the resource management application. Since, in one embodiment, these definitions are based on parsing of XML documents that define these definitions, an application designer can define new tasks, new managed resources, and new views (or any combination thereof) in order to display different results of the application of such new tasks to such new resources in such new views. The architecture of embodiments of this invention thus provides a flexible framework for declarative software graphical user interfaces for use in resource management applications.

Other embodiments of the invention include a computerized device, such as a workstation or other computer system, configured to process all of the method operations disclosed herein as embodiments of the invention. In such embodiments, the computer system includes a display, a memory system, a processor and an interconnection mechanism connecting the display, the processor and the memory system. In such embodiments, the memory system is encoded with a resource management application that when performed on the processor, produces a resource management process that includes a graphical user interface produced on the display of the computer system. The graphical user interface allows the resource management process to perform all of the method embodiments and operations explained herein as embodiment of the invention.

Other arrangements of embodiments of the invention that are disclosed herein include software programs to perform the method embodiment operations summarized above and disclosed in detail below. More particularly, a computer program product is disclosed which has a computer-readable medium including computer program logic encoded to provide a graphical user interface for the display of managed object data as explained herein. The computer program logic, when executed on at least one processor with a computer system, causes the processor to perform the operations (e.g., the methods) indicated herein as embodiments of the invention. Such arrangements of the invention are typically provided as software, code and/or other data arranged or encoded on any type of computer readable medium such as an optical medium (e.g., CD-ROM), floppy or hard disk, or other a storage medium such as firmware or microcode in one or more Read Only Memory (ROM) or Random Access Memory (RAM) or other microchips or as an Application Specific Integrated Circuit (ASIC). The software, firmware or other such configurations can be installed and operated within a computer system to cause the computer system to perform the techniques explained herein as embodiments of the invention.

It is to be understood that the system of the invention can be embodied strictly as a software program, as software and hardware, or as hardware alone (e.g., via implementation in circuitry). An example embodiment of the invention is implemented within the EMC Control Center (ECC) software application that provides graphical management functionality of storage area network (SAN) managed resources in a SAN environment. ECC is manufactured by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

Figure 1:
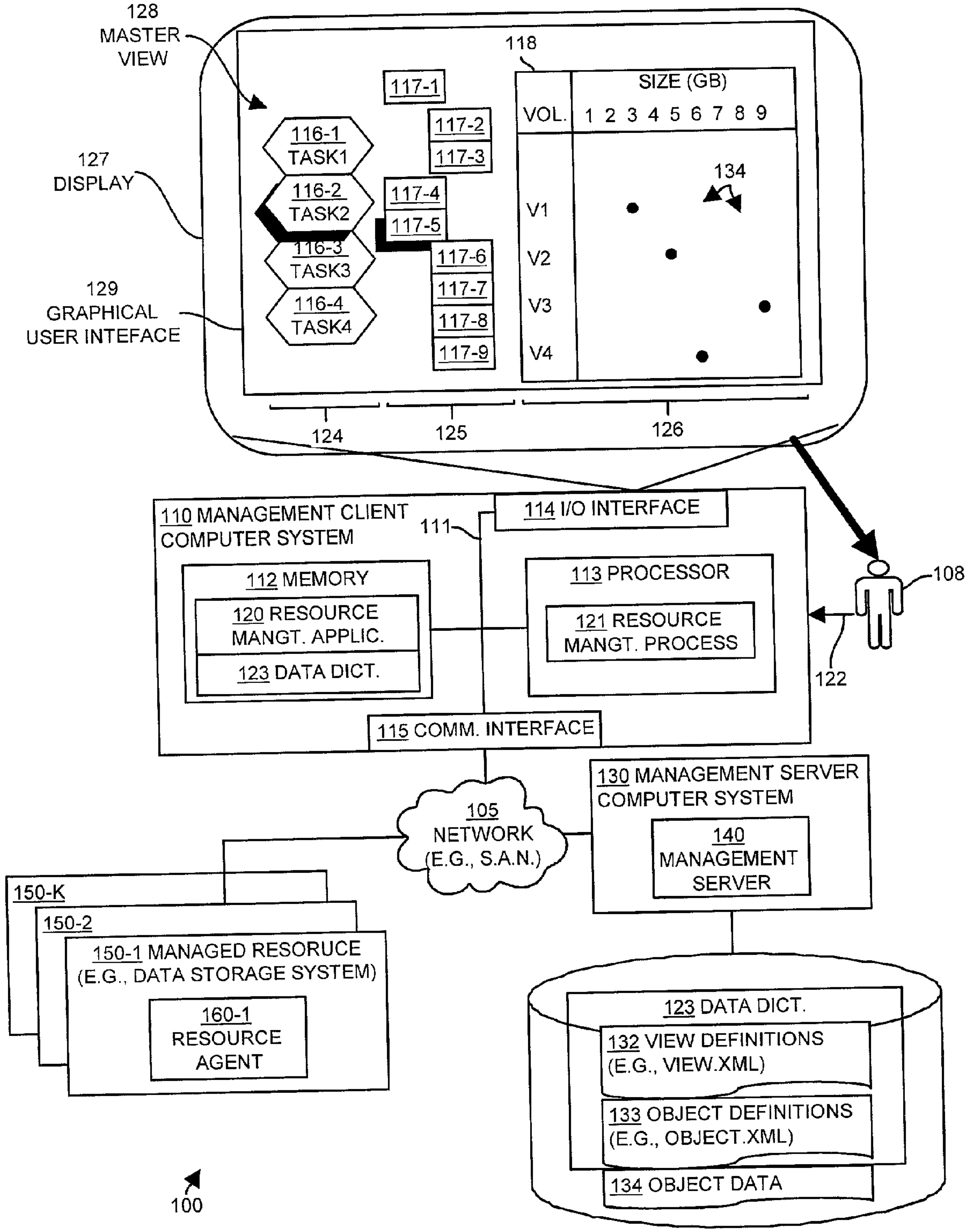
FIG. 1 illustrates an example of a computing system environment including a management client computer system and management server computer system configured according example embodiments of the invention.

Embodiments of the invention provide unique mechanisms and techniques to obtain, represent (i.e., internally, such as in a memory, and visually) and graphically display managed resource information such as managed object data associated with managed resources operating in a computing system environment. An example embodiment is a resource management software application which allows a user such as a resource administrator (e.g., systems or network manager) to graphically manage managed computing system resources such as hardware devices and/or software processes that can include networked data storage systems, network devices, and/or host or server computer systems and any software processes associated therewith. Using a unique internal representation that provides flexible definitions of managed object data associated with such managed resources, as well as task and view definitions used for manipulating and viewing such data, embodiments of invention provide a flexible and scalable framework for creating, accessing and graphically rendering managed resource information.

In operation, preferred embodiments provide a resource management application that displays a master view on a graphical user interface of a computer system that contains graphical representations of user selectable tasks that may be applied to graphical representations of various user selectable managed objects that represent managed resources. Tasks can represent, for example, systems management operations or functions that a systems manager can invoke or apply to one or more of the selected managed objects. Instead of using predefined or hardcoded menu functions and output displays for results obtained from applying functions to resources as in conventional resource management application designs, resource management applications configured according to embodiments of the invention access a dynamically defined in-memory data dictionary that contains definitions of the tasks and mappings, for each task, of specific selected managed objects (i.e., managed resources) to one or more view definitions that define view(s) that are appropriate for displaying any managed object data produced as a result of the application of a function associated with the task to managed resource(s) associated with the managed object selections. Using such a framework, the resource management application can display an appropriate view on the graphical user interface of the computer system and can obtain the appropriate managed object data related to the selected resources as required or specified by a view definition that defines the view.

The view definition in the data dictionary can direct the resource management application to display specific managed object data within the view so that the user can see the results of the application of the task to the selected resources. In this manner, the resource management application does not need to have predefined knowledge about what functions (e.g., tasks) or resulting data are to be displayed as a result of application of predefined tasks to predefined resources. Instead, the tasks, resources and views in the framework provided by embodiments of the invention are dynamically generated and provided to the resource management application within the data dictionary, such that tasks, resources and views can be dynamically created, changed or removed without modification of a core portion of the resource management application. As a result, newly created resources can be managed, configured or otherwise viewed and manipulated without having to recode the management application.

As an example, as additional managed resources become available for management by a resource management application configured according to embodiments of this invention, the data dictionary can be updated with new managed object definitions that represent such managed resources. In addition, a developer can easily create new task definitions and view definitions that define views for displaying managed object data related to those new resources. In addition, the view definitions can be defined to dynamically display the new resource data according to different styles of graphical presentation, which can be transformed as needed depending upon circumstances.

One embodiment uses the eXtensible Markup Language (XML) to define one or more documents that contain the task definitions, view definitions, object definitions and style definitions. An XML task definition defines or references, for example, a task widget that provides the user views and menus. A managed object definition defines attributes of a managed resource that can be displayed or controlled (i.e., managed) by the resource management application (e.g., to which the management function of a task can be applied). A view definition defines what attributes or specific managed object data related to managed resources (referred to as managed object data) is to be displayed in a certain view defined by the view definition. In this XML-based embodiment, these XML documents are parsed with an XML parser to produce an XML document object model referred to herein as the data dictionary.

The resource management application can access the data dictionary for task, view, object and style definitions. In this manner, the resource management application can obtain the XML-based data dictionary as the core data structure defining a master view (e.g., an initial view presented to the user which includes the user selectable tasks and managed objects), as well as the views to be rendered upon a user providing a selection of specific tasks to apply to specific managed object selection(s). The management application is thus a lightweight or skeletal application that does not need to have complete predefined or hard-coded knowledge of what resources to display in which predefined views at all times. In addition, since preferred embodiments of the data dictionary conform to the XML document object model standard, resource management applications can be web browser-based, thus allowing resource management to occur in networked computing environments such as storage area networks (SANs) or over wide area networks such as the Internet.

FIG. 1 illustrates a computing system environment 100 that is suitable for use in explaining example operations of embodiments of the invention. The computing system environment 100 includes a network 105, which may be for example, a storage area network (SAN), which couples a management client computer system 110, a management server computer system 130 and one or more managed resources 150-1 through 150-K. The computer systems 110 and 130 can be any type of computerized device such as a personal or portable computer (e.g., laptop, handheld or desktop PC), workstation, minicomputer, mainframe or the like. The managed resources 150 can be any type of manageable hardware or software resource such as a data storage system, network device, host or server computer system or any type of software processes operating on or in conjunction with such devices. The network 105 may be any type of communications media supporting data or other types of communications in a local area network (LAN), wide area network (LAN) or Internet configuration or a combination thereof or in a storage area network (SAN) configuration.

The management client computer system 110 includes an interconnection mechanism 111 that couples a memory 112, a processor 113, an input/output interface 114 and a communications interface 115. The input/output interface 114 couples a display 127 to the computer system 110. The communications interface 115 allows the computer system 110 to communicate with devices (e.g., computer system 130 or the managed resources 150) that operate on the network 105. The memory 112 can be any type of computer readable medium such as a semiconductor memory (random access or read only), or may be a volatile memory such as a disk, tape or other medium. The memory 112 is encoded with a resource management application 120 and a data dictionary 123. While not shown in this example, those skilled in the art will understand that the computer system 110 (and 130) may include other processes and/or software and hardware components, such as an operating system, which have been omitted from this illustration for ease of description of the invention.

The resource management application 120 and data dictionary 123 represent data and/or logic instructions (e.g., software code) that embody the data structures and processing functionality of embodiments of the invention. The processor 113 can access the memory 112 via the interconnection mechanism 111 in order to run, execute, operate, interpret or otherwise access and/or perform the data and logic instructions of the resource management application 121 and the data dictionary 123. The resource management process 121 represents the operation of the resource management application 120 in the computer system 110. In other words, the resource management process 121 represents one or more portions of the resource management application 120 (or the entire application 120) performing within or upon the processor 113 in the management client computer system 110.

According to the general operation of the resource management process 121, which will be explained in detail shortly, the process 121 operates to obtain and access the data dictionary 123 to display a master view 128 in the graphical user interface 129 on the display 127. The master view 128 includes one or more user selectable tasks 116 and one or more user selectable managed objects 117. The resource management process 121 allows a user 108 to provide one or more task selections 116 (e.g., task selection 116-2 "TASK2" is selected in this example) and one or more managed object selections 117 (e.g., managed object selection 117-5 is selected in this example). The task selections 116 represent various resource management functions (e.g., system administration functions, procedures, operations or commands) which a user 108 (e.g., a systems or network manager) can apply to the managed object selection(s) 117 that represent managed hardware and/or software resources 150 operating within the computing system environment 100. As a result of such input (i.e., task and managed object selections), the resource management process 121 identifies and displays a view 118 on the graphical user interface 129. The resource management process 121 then obtains managed object data 134 that is related to or referenced by the view 118 and displays the managed object data 134 in the view 118 for viewing by the user 108.

In order to accomplish the aforementioned processing, the resource management process 121 accesses the data dictionary 123. While not shown in this figure, in this example embodiment, the data dictionary 123 contains a master view definition as well as task definitions, managed object definitions, view definitions and style definitions which define how the master view 128, task selections 116, managed object selections 117, view(s) 118 and managed object data 134 are to be displayed on the graphical user interface 129. The data dictionary 123 is preferably a hierarchically arranged (e.g., as a tree) document object model configured according to a markup language format such as, for example, an XML document object model standard. The resource management process 121 obtains the data dictionary 123 from the management server 140 operating within the management server computer system 130, as will be explained.

The management server computer system 130 operates the management server 140 which is a software application (and process) which, when operating, interacts with resource agents 160 that operate on or in conjunction with the various managed hardware and software resources 150 to collect managed object data 134. As an example, the managed resource 150-1 may be a data storage system upon which a resource agent 160-11 operates (e.g., executes) to periodically gather performance and statistical information concerning the state of operation of the data storage system resource 160-1. The resource agent 160-1 transfers this information as managed object data 134 to the management server computer system for receipt and storage by the management server 140. In addition, the management server 140 can direct a resource agents 160 to perform or invoke certain management functions (e.g., associated with task selections 116, as will be explained) upon a managed resource 150 in which the agent 160 operates. Such interactive functionality between the management server 140 and the resource agents 160 can be provided by a protocol such as the Simple Network Management Protocol (SNMP), or by another protocol.

Aside from remotely operating the various resource agents 160 to collect managed object data 134 and instructing the resource agents 160 to perform systems management operations on the managed resources 150, the management server 140 includes a document parser (not shown in this example) such as an XML parser. Using the XML parser, the management server 140 can access a view definitions document 132, an object definitions document 133, and the managed object data 134 in order to produce the data dictionary 123 which, in this example, is a document object model conforming to an XML standard. The documents 132 and 133 in this example are XML documents containing master view, task, object, view, style and menu definitions. Example portions of such documents 132 and 133 will be provided in Appendix A included at the end of this detailed description. Upon detection of the startup of a resource management application 121 within a management client computer system 110 (i.e., upon an initial instantiation of a resource management process 121), the resource management process 121 can query the management server 140 to provide the data dictionary 123 to the resource management process 121 thus allowing it to operate as explained herein according to embodiments of the invention.

It is to be understood that embodiments of the invention include the resource management application 120 (i.e., the un-executed or non-performing logic instructions and/or data) encoded or residing within any type of computer readable medium such as a floppy disk, hard disk or optical medium, or in a memory system such as in firmware, read only memory (ROM), or, as in this example, as executable code within the memory system 112 (e.g., within random access memory or RAM). It is also to be understood that other embodiments of the invention comprise the resource management process 121 operating or performing within the processor 113 in the management client computer system 110.

Figure 2:
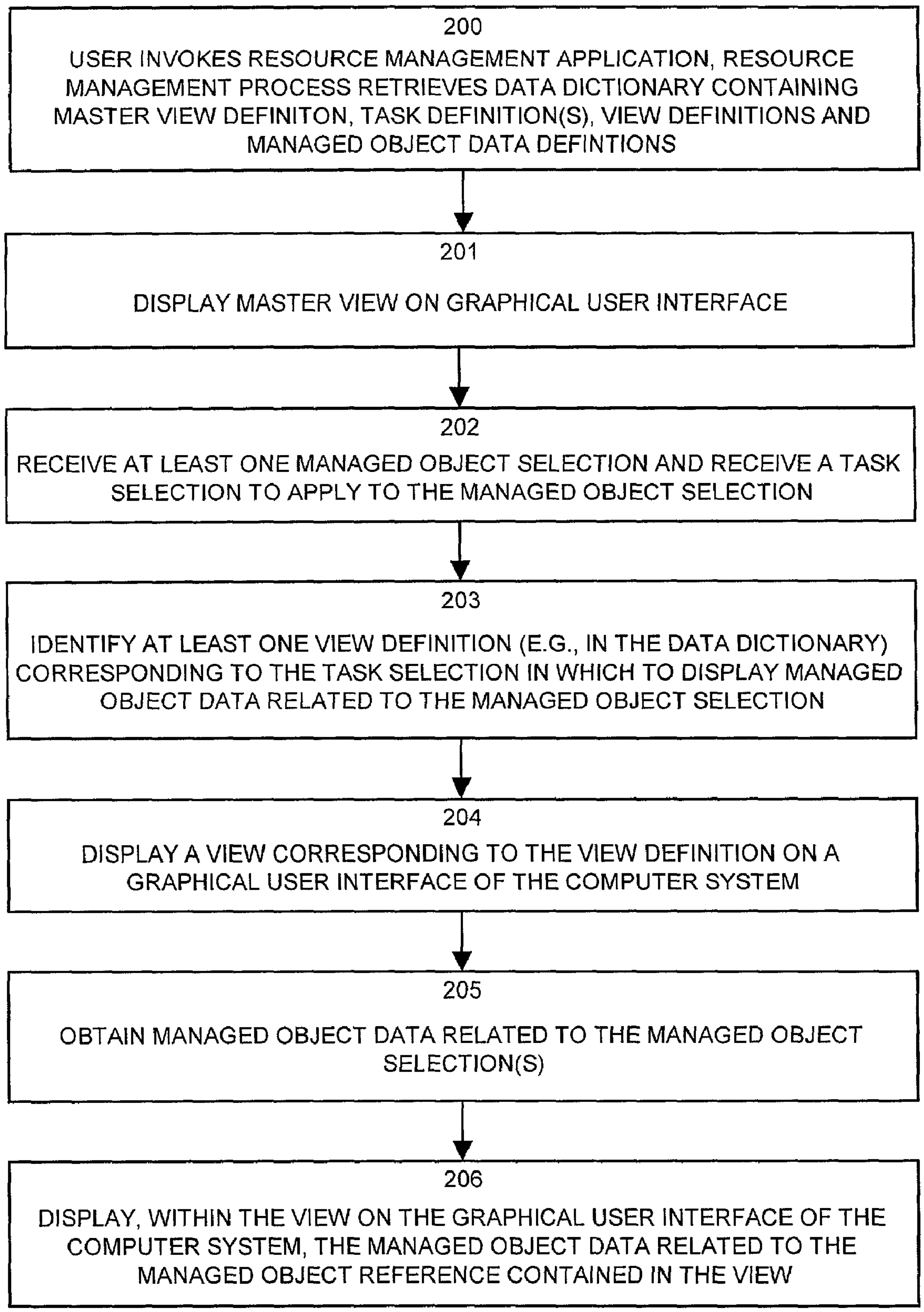
FIG. 2 is a flow chart of processing operations that convey the general operation of a resource management process configured according to an example embodiment of the invention.

FIG. 2 is a flow chart of processing steps that are performed by a resource management process 121 configured according to one embodiment of the invention.

In step 200, the user 108 invokes the resource management application 120 causing instantiation of the resource management process 121. In response, the resource management process 121 retrieves the data dictionary 123 (e.g., from the management server 140, or from the memory 112 if already present within the management client computer system 110). In this embodiment, the data dictionary 123 contains a master view definition, task definitions, view definitions and managed object data definitions that are arranged in a hierarchical document object model format according to, for example, an XML standard.

Next, in step 201, the resource management process 121 displays a master view 128 on the graphical user interface 129 by referencing a master view definition within the data dictionary 123. Generally, the master view definition within the data dictionary 123 defines the screen layout or format for placement of the selectable tasks 116 and selectable resources 117 on the graphical user interface 129. In the example of FIG. 1, the task selections 116 are displayed in a task display area 124 of the graphical user interface 129 and the managed object selections 117 are displayed in a resource display area 125 on the graphical user interface 129. Preferably, hierarchical relationships that exist between managed object selections 117 are conveyed to the user 108 by displaying the managed object selections 117 according to hierarchical resource definition relationships existing within the document object model in the data dictionary 123.

Next, in step 202, the resource management process 121 receives at least one managed object selection 117 and receives a task selection 116 to apply to the managed object selection 117. In the example illustration in FIG. 1, the user 108 has provided a task selection 116-2 and a managed resource selection 117-5, as shown by the highlighted border of these icons on the graphical user interface 129. In doing so, the intent of the user 108 is to apply a systems management function or operation associated with a task selection 116-2 to a particular managed resource 150 associated with the resource selection 117-5. The task selections 116 can be icons that represent various systems management, configuration or monitoring operations, while the managed object selections 117 can be icons or other symbols that graphically represent the various managed hardware and software resources 150 operating within the computing system environment 100. In one embodiment, the task selections are contained in task definitions that can define task menus of operations related to that task. Though not shown in this example, the user 108 can provide, for example, the selection of multiple managed objects 117 upon which to apply a selection of multiple task selections 116.

In step 203, the resource management process 121 identifies at least one view definition in the data dictionary 123 that corresponds to the task selection 116 and that defines a view 118 in which to display managed object data 134 related to the managed object selection 117.

Next, in step 204, the resource management process 121 displays the view 118 corresponding to the view definition (i.e., from the data dictionary 123) on the graphical user interface 129 of the management client computer system 110. The view 118 essentially defines a graphical template or structure in which managed object data 134 can be displayed. Examples of views can be tables, graphs, maps, text windows, charts, and the like. The resource management process 121 can render the view 118 defined in the view definition (to be explained more detail shortly) within the data dictionary 123 based upon style information associated with the view definition in the data dictionary 123 such that, depending upon what task and resource selections 116 and 117 are made by the user 108, different views 118 can be used to display the same or different managed object data 134 in different ways. According to the example of view 118 illustrated in FIG. 1, a table view comparing volume sizes is provided by the view definition.

In step 205, the resource management process 121 consults the view definition within the data dictionary 123 in order to obtain managed object data 134 based upon managed object data references (not shown in FIG. 1 or 2) contained within the view definition in the data dictionary 123. In other words, the view definition in the data dictionary 123 defines what portions of managed object data 134 are to be displayed within the view 118 on the graphical user interface 129.

As shown in the example in FIG. 1, the view definition for the view 118 references specific volume names "V1" through "V4" for placement across the top row of the table view 118. In addition, the view definition for the view 118 can define or reference a volume size range computation function (not shown) that can compute a size range of all volumes to be displayed by the view 118 (volume data referenced by the view definition). This size range (1 GB to 9 GB in this example) can be displayed in the left hand column of the table view 118. Further still, the view definition in the data dictionary 123 for the table view 118 can reference a volume size plotting function or method which can compute and create a data point corresponding to the size of the volumes referenced by the table view 118. One embodiment can user filters that utilize the data dictionary 123 to filter the data to be shown within the view. While not shown in FIG. 1, the processing of step 205 causes the resource management process 121 to calculate, reference or otherwise obtain such information from the management server 140 for placement into the view 118.

Next, in step 206, the resource management process 121 displays, within the view 118 on the graphical user interface 129 of the management client computer system 110, the managed object data 134 related to the managed object references contained within the view definition in the data dictionary 123. In other words, in step 206, the resource management process 121 displays, within the view 118, managed object data 134 produced as a results of processing step 205.

In this manner, the resource management process 121 uses the data dictionary 123 as a basis for determining which tasks 116 and managed objects 117 can be displayed for user selection in the master view 128. Then, based on these selections 116 and 117, the data dictionary 123 defines specific view definitions that define a view to be displayed on the graphical user interface 129. In turn, the view definition further defines or contains references to attributes of managed object data 134 whose values are then displayed within the view 118. This provides the user 108 with a visual indication of the results of the application of the specific task selection 116 to a specific selection of managed objects 117.

Figure 3:
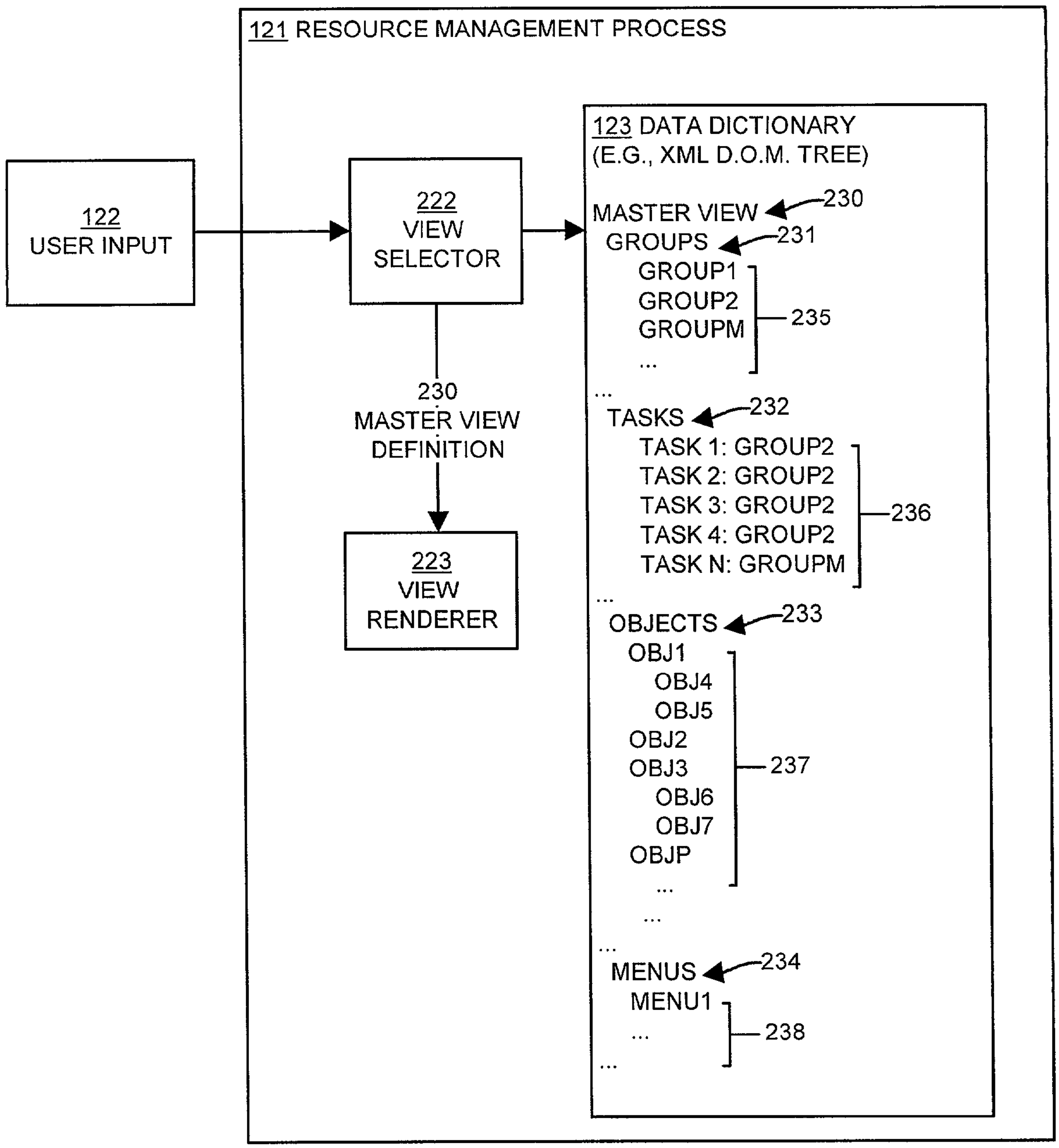
FIG. 3 illustrates an example architecture of a resource management application and process and a structure of an example data dictionary configured according to one example embodiment of the invention.

FIG. 3 illustrates some details of an example software architecture of a resource management process 121 (and hence the resource management application 120) configured according to one embodiment of the invention. In addition, FIG. 3 illustrates an example of some of the contents of the data dictionary 123 configured according to one embodiment of the invention. In this embodiment, the resource management process 121 includes a view selector 222 and a view renderer 223. The view selector 222 and a view render 223 may be routines, methods or procedures that the resource management process 121 can invoke as needed to accomplish the processing of this embodiment.

Upon startup of the resource management process 121, the view selector 222 retrieves the data dictionary 123. In this example embodiment, the data dictionary 123 is an XML document object model or tree which includes a master view definition 230, a group definition section 231 containing a plurality of group definitions 235, a task definition section 232 containing a plurality of task definitions 236, an object definition section 233 containing a plurality of object definitions 237, and a menu definition section 234 containing menu definitions 238 which define the contents of any menus that the resource management process 121 can display to the user 108 during operation of the resource management process 121.

Once the resource management process 121 obtains the data dictionary 123, the view selector 222 passes the master view definition 230 to the view render 223 which displays the master view 128 upon the graphical user interface 129 (FIG. 1). In the example data dictionary 123 shown in FIG. 3, the task definitions 236 are arranged according to specific group definitions 235 which represent categories or classifications of resource management functions. While not shown in the example master view 128 in FIG. 1, the resource management process 121 can operate the view render 223 to render a master view 128 (FIG. 1) that includes tasks 116 arranged according to specific functional groups. For example, performance tasks 116 may be associated with a performance group defined by a performance group definition 235. A user may select a performance group on the graphical user interface 129 in order to view all performance tasks 116 that the user 108 can select to monitor the performance of one or more managed resources 150. Other group definitions 235 may exist as well, such as an administration group, a monitoring group, the configuration group and so forth. Each task definition 236 may be associated with one or more group definitions 235.

The object definition section 233 of the data dictionary 123 provides a plurality of object definitions 237 which define various attributes of managed resources 150 which the resource management process 121 can access (e.g., for display or management purposes). As will be explained shortly with respect to FIG. 4, task definitions 236 map specific managed object selections 117 to specific view definitions (not shown in the example of FIG. 3) that are also contained or defined in the data dictionary 123. The view definitions (to be explained in FIG. 4) define views 118 that reference specific attributes or data fields within the object definitions 237 in order to obtain any managed object data 134 associated with those attributes of those object definitions 237 for display purposes within the view 118 upon the graphical user interface 129.

The master view definition 230 thus allows the view renderer 223 to display the initial graphical user interface 129 that contains the various tasks 116 arranged according to group definitions 235 and that contains the object definitions 237 displayed as selectable managed objects 117 (FIG. 1) according to the hierarchy within the object definition section 233 of the data dictionary 123.

Figure 4:
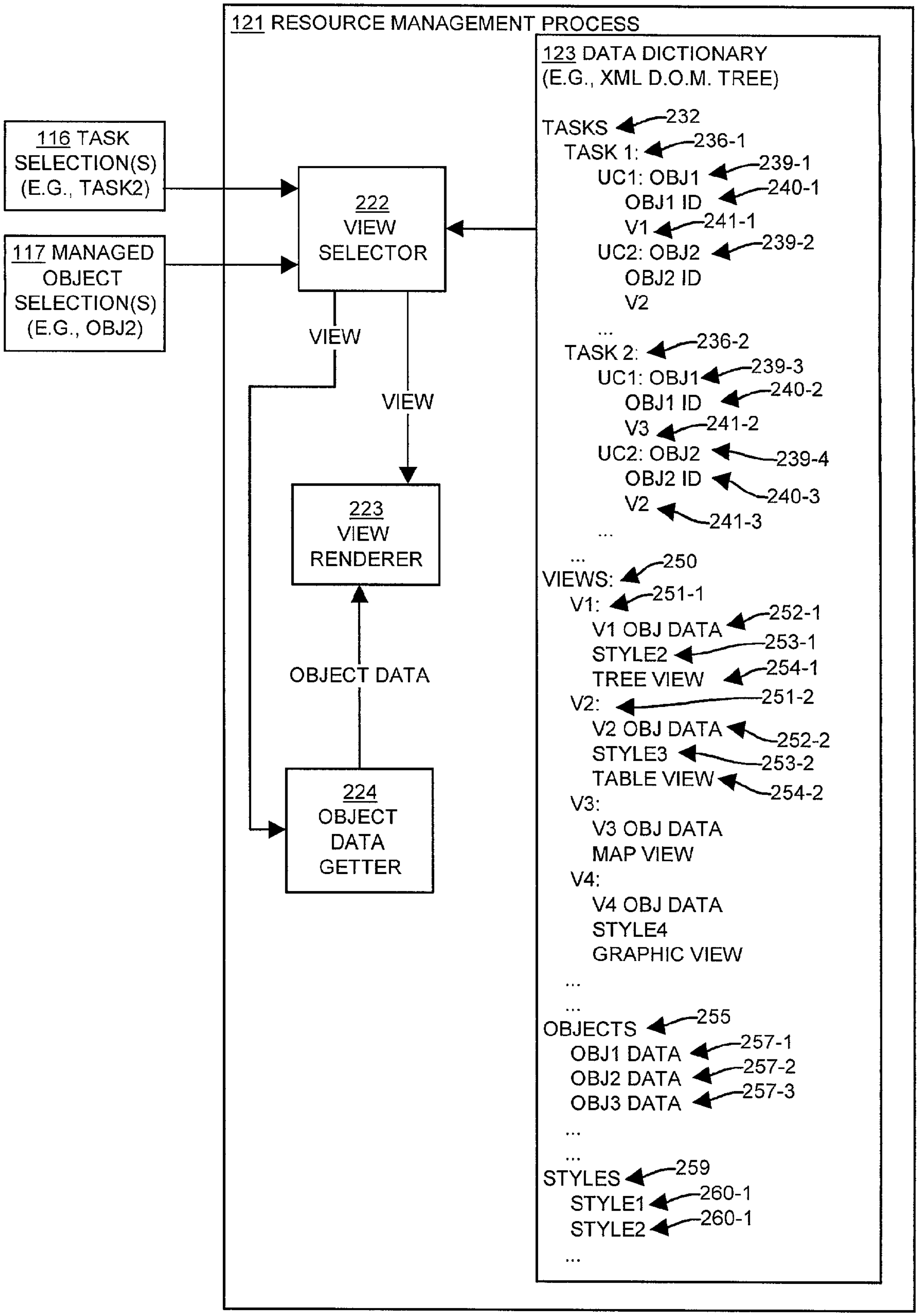
FIG. 4 illustrates a more detailed example architecture of a resource management application and process and a structure of an example data dictionary configured according to one example embodiment of the invention.

FIG. 4 illustrates further details of the example architecture of the resource management process 121 and the example data dictionary 123 used for processing user task selections 116 in conjunction with managed object selections 117. In this example, the resource management process 121 also includes an object data getter 224.

In the example data dictionary 123 in FIG. 4, the task definition section 232 includes a plurality of task definitions 236-1, 236-2 and so forth. Each task definition 236 includes one or more "use cases" 239, labeled in this example as "UC1: OBJ1," "UC2:OBJ2" and so forth. Each use case 239 within a task definition 236 provides a mapping between a specific managed object selection 117 (i.e., a selection from the graphical user interface 129), as indicated by a corresponding object identifier 240, to a specific view definition 251 as indicated by a view identity 241 for that use case 239.

By way of example, the task definition 236-2 for "TASK2" in the data dictionary 123 (FIG. 4) corresponds to the task selection 116-2 in FIG. 1. Suppose for this example that the user selects the task selection 116-2 and selects the managed object selection 117-5 on the graphical user interface 129 (i.e., as shown in the example in FIG. 1). Using such input, the view selector 222 (FIG. 4) traverses the document object model within the data dictionary 123 and references the "TASK 2" task definition 236-2 (based on the task selection 116-2 from the graphical user interface 129) in order to determine which use case (or cases) 239 corresponds to the user's managed object selection 117-5 (e.g., OBJ2 in this example). As indicated in the data dictionary 123, the use case "UC2: OBJ2" 239-4 applies and specifies that data related to the object identity or type "OBJ2 ID" 240-3 (which matches the managed object selection type 117-5 for OBJ2) should be displayed using the view provided by the view identity "V4" 241-3. In other words, if the user 108 desires to apply a management function associated with the task selection 116-2 for "TASK 2" to a managed object (i.e., to a managed resource 150) corresponding to the managed object selection 117-5, the resource management process 121 references a view defined by the view definition 251-2, which is the view definition that corresponds to the view identity "V4" 241-3.

The view definition section 250 of the data dictionary 123 includes a plurality of view definitions 251-1, 251-2, and so forth. Each view definition 251 includes an identification 252 of specific managed object data 134 that is to be displayed within a view 118. The view 118 itself is identified by a view type 254 in a view definition 251. Therefore, the view is created based on the view definition. In addition, some view definitions can include a view style 253 that references information that indicates how the view 118 or its managed object data 134 (referenced at 252 in the view definition) is to be displayed on the graphical user interface 129. The view style 253 is optional in this embodiment and if omitted from a view definition 251, a default view 118 will be displayed according to the view type 254.

By way of example, the view definition "V2" 251-2 (referenced by the use case "UC2:OBJ2" 239-4 in the task definition 235-2, as discussed above) provides meta data that is specific to a type or types of managed object data "V2 OBJ DATA" 134 that is to be displayed on the graphical user interface 129 within a table view 118 defined by the view style "TABLE VIEW" 254-2. The identification 252 of types of managed object data can specify, for example, attributes of data existing within the managed object definitions 257 that are defined in the object definition section 255 of the data dictionary 123. In this example, the identification 252-2 "V2 OBJ DATA" might reference, for example, attributes of managed object data 134 defined in the object definition 257-1 "OBJ2 DATA." The view takes the type of managed object data and applies the management function to produce managed object data that is displayed in the view. With respect to the example in FIG. 1, the managed object data 134 might be volume size information of each volume of data storage associated with the managed object selection 117-5, which may be a data storage system, for example.

In this embodiment, the view style 253 within a view definition 251 is an optional view definition field that identifies a specific style definition 260 within the style definition section 259 (in the data dictionary 123) with which the managed object data 134, identified by the identification 252, is to be displayed within the view 118. As an example with respect to FIG. 1, the view style 253-2 within the view definition 252-2 specifies that the managed object data 134 is to be displayed as bullets or dots within table view 118 (corresponding to table view type 254-2) on the graphical user interface 129. The specific managed object data 134 that is to be displayed in this manner is identified by the identification "V2 OBJ DATA" 252-2 which references attributes of an object definition 257, such as object definition 257-2 for OBJ2. A style can also describe how a string showing the data should appear on the graphical user interface so that, for example, a style turns a value of "200,000,000,000" bytes into "20 GB" or "0.2 TB".

Figure 5:
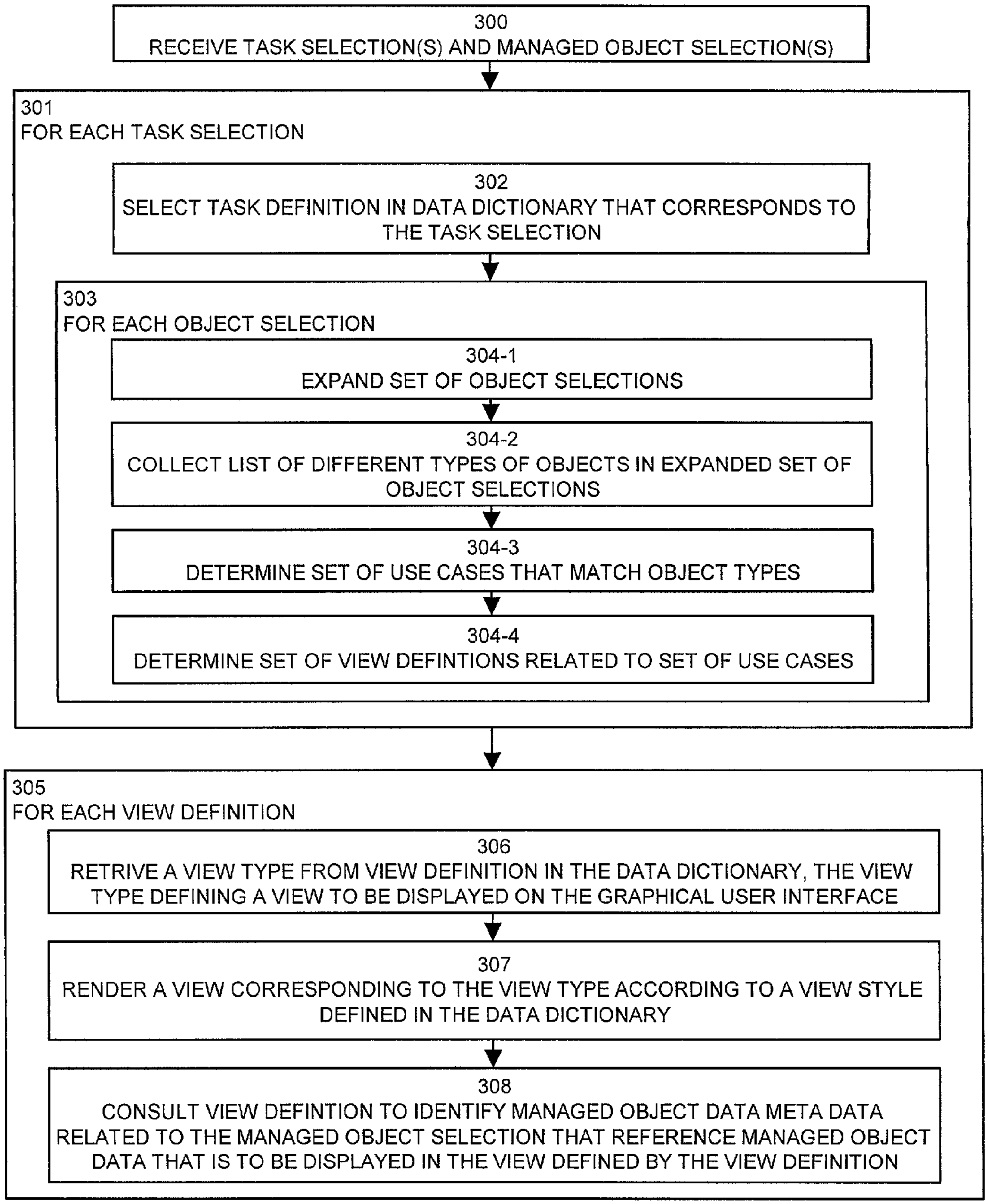
FIGS. 5 and 6 are flow charts of processing operations that shown how a resource management process can operate using a data dictionary to display managed object data in accordance with one example embodiment of the invention.
Figure 6:
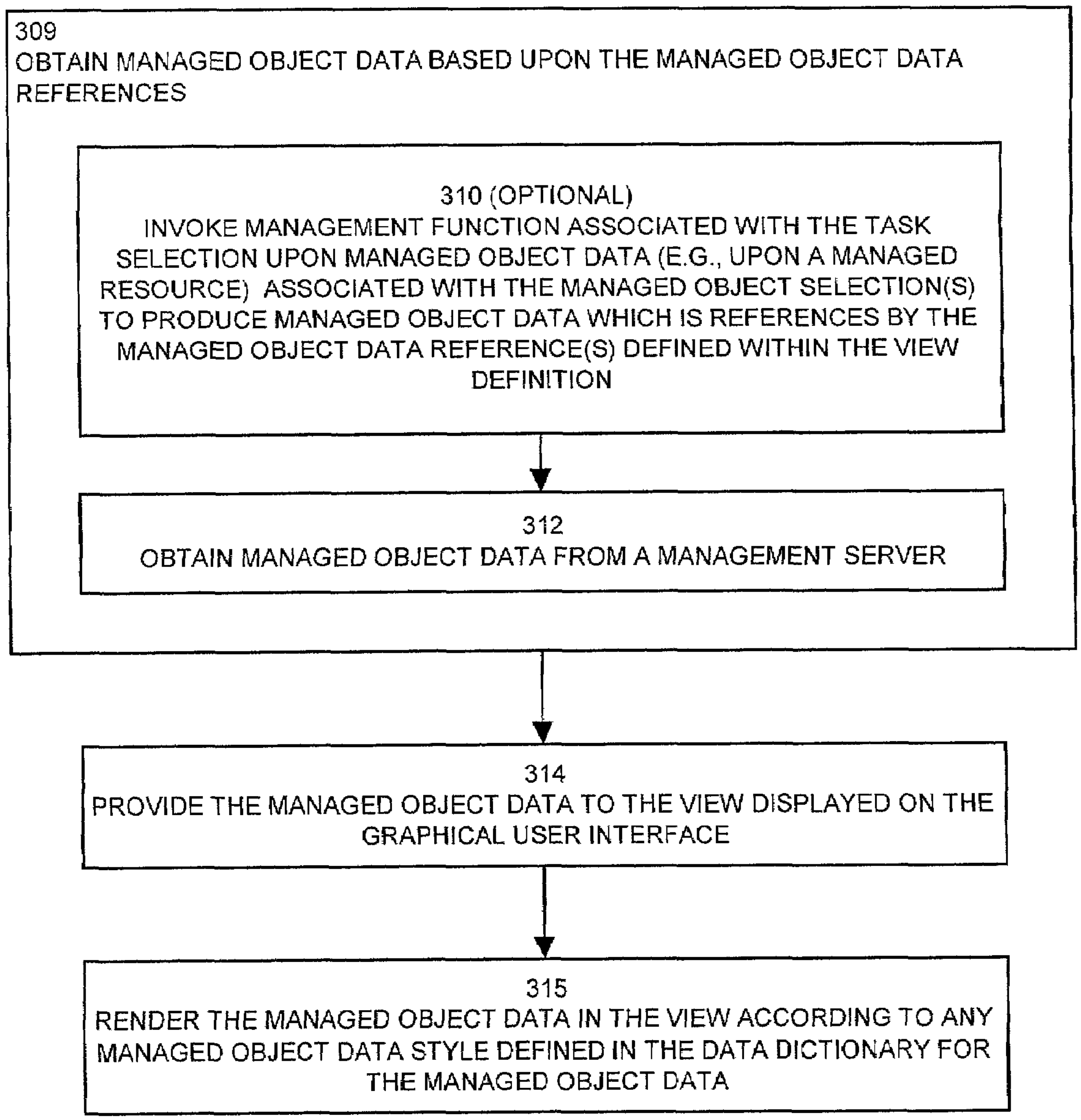

FIGS. 5 and 6 provide a flow chart of processing steps which are performed by the resource management process 121 illustrated in FIG. 4 to accomplish the aforementioned display of managed object data 134 using the data dictionary 123 according to one embodiment of the invention. In performing the processing of FIGS. 5 and 6, the resource management process 121 operates the view selector 222, the view renderer 223, and the object data getter 224 as will be explained.

In step 300, the resource management process 121 operates the view selector 222 to receive task selections 116 and managed object selections 117 from the user 108. As previously explained, the task selection 116 identifies a user selection on a specific task representing a management function. The managed object selections 117 indicate specific managed resources 150 within the computing system environment 100 upon which the management function associated with the task selection 116 is to be performed.

In step 301, the view selector 222 enters a loop of processing operations which are performed for each task selection 116.

In step 302, within the processing loop 301, the view selector 222 selects the task definition 236 in the data dictionary 123 that corresponds to the task selection 116.

In step 303, once the task definition 236 within a data dictionary 123 is identified for the particular task selection 116 provided by the user, the view selector 222 enters a processing loop which occurs for each object selection 117 selected by the user 108. Generally, the purpose of the processing loop is to define a set of view definitions that define views that can be used to render the managed object data on the graphical user interface. Recall that view are defined or otherwise referenced within one or more use cases that are in turn defined or referenced within task definitions. Accordingly, the general goal of processing of the loop of step 303 is to determine a set or list of view definitions associated with use cases that match the object selections (or that match object related to the object selections in the case of group objects).

To accomplish this goal in one particular embodiment, in step 304-1, the view selector 222 first creates an expanded set of object selections for the selected object selection for this iteration of the loop defined by step 303. As an example, suppose the current object selection being processed in this iteration of the loop defined by step 303 is a group object. In such instances, managed object data that will be required to be shown in the graphical user interface 129 will be related to any managed objects within the selected group object. As such, the processing of step 304-1 expands the set of object selections to include these "child" objects in the group by determining any child objects that may be related to the group object selection for which a view must be generated to display managed object data for those child objects.

In one embodiment of step 304-1, the view selector 222 expands the set of object selections to include other objects by determining if the current object selection (i.e., the object selection being processed in this iteration of the loop of step 303) is a group object selection. If the current object selection is a group object selection and the group type for the current object selection matches a use case for the current task selection (i.e., the task selection being processed in the iteration of the loop defined by step 301), then the view selector 222 adds the child objects (i.e., the objects in the group) of the current group object selection to an expanded set of object selections. This process is repeated in this example embodiment of step 304-1 until a use case in the current task selection indicates that the children should not be added into the expanded set of object selections. Generally then, step 304-1 allows the view selector to gather an expanded set of object selections in the event that the object selection in step 303 is a group object. The object selections added to the expanded set of object selections are child objects for which the group type of the current object selection matches one or more use cases defined in the task definition associated with the current task selection.

After processing step 304-1, the view selector 222 has defined an expanded set of object selections that include the managed object selection for this iteration of step 303 (i.e., the object selected by the user) as well as any object related to this object selection (e.g., child objects if the selected object were a group object).

Next, in step 304-2, the view selector 222 collects a list of different object types within the expanded set of object selections. In other words, suppose the current object selection being processed in this iteration of step 303 is a group object with ten child objects (i.e., there are ten managed objects in the group). Step 304-1 may have added these ten child objects into the expanded set of object selections, and the expanded set also includes the originally selected object selections as well, for a total of eleven objects. Each of these eleven objects may have the same or different object types. Step 304-2 thus determines a list of all of the different types of object selections within the expanded set of object selections.

Next, in step 304-3, the view selector 222 determines, for each different object type (determined in step 304-2), any use cases defined within the current task selection (for this iteration of the loop defined by step 301) that match the object type. In other words, in step 304-3, each object type in the list of different object types developed in step 304-2 might match one of more use cases defined in the current task selection. Step 304-3 thus generally causes the view selector 222 to gather a list of all use cases that match the different object types.

In one embodiment of step 304-3, a use case can contain a "stop" indication that causes the processing in step 304-3 to stop for that particular object type, and thus any other use cases defined further down in the current task definition will not be examined to determine if this object type also matches these other use cases. Accordingly, in this embodiment, the order of use cases within the current task selection can make a difference as to what use cases are matched to object types in step 304-3.

In another embodiment of step 304-4, what is meant by the term "match" (in the context of matching object types to use cases) is an exact match. In an alternative embodiment of step 304-4, a match is determined to exist between a use case and an object type if the object type is a sub-type of the use case. In other words, object types can be arranged in a hierarchical manner, with object types and sub-object types.

Accordingly, in this variation, if the object type is defined in this object type hierarchy as a sub-type of the use case type, then in step 304-3, the view selector determines that a match exists as well (even though it is not an exact match). After processing step 304-3, the view selector 222 will have produced a list or set of one or more use cases.

Next, in step 304-4, the view selector 222 determines the set of view definitions that are related to the set of use cases produced in step 304-3. Recall that each use case references or defines at least one view definition. Accordingly, the set of resulting use cases produced from the aforementioned processing of this example embodiment of the invention provides references to a set of view definitions defined by or within the set of use cases. In this manner, embodiments of the invention can determine what view definitions are required to produce views that can render the proper managed object data.

Next, in step 305, the view renderer 223 enters a loop which processes steps 306 through 308 for each view definition 251 that the view selector 222 identified by the use case(s) 239 as processed in step 304.

Within the loop defined by step 305, if the view does not already exist on the graphical user interface 129, the view renderer 223, in step 306, retrieves a view type 254 from the view definition 251 in the data dictionary 123. The view type 254 defines a certain type of view 118 that is to be displayed on the graphical user interface 129. As previously noted, types of views can include table view, map views, chart views, graph views, text views or other any other types of view in which managed object data 134 can be displayed. The view type 254 might, for instance, reference a particular view method, function or procedure (e.g., a widget) that can graphically render a view of that type.

In step 307, the view renderer 223 renders the view 118 corresponding to the view type 254 according to a view style 253. As noted above, the view style 253 references a particular style definition 260 which can indicate how a view 118 is to appear on the graphical user interface 129. As an example, the view definition 251-2 "V2" specifies that a table view 254-2 is to be displayed on a graphical user interface 129. The style 253-2 "STYLE3" might define or reference, for example, style definition information 260 within the style definition section 259 of the data dictionary 123 which indicates how many columns the table should include and whether there are to be borders between rows and columns, the size of the table, row colors, table colors, shading, and the like. By way of example with respect to FIG. 1, the view renderer 223 displays the table view 118 on the graphical user interface 129. At this point in processing, in this embodiment of the invention, the managed object data 134 is not yet displayed on the graphical user interface 129.

Next, in step 308, the view renderer 223 consults the view definition 251 to identify any managed object data references 252 (e.g., related to the managed object selection 117) that reference managed object data 134 within one or more object definitions 257 that is to be displayed in the view 118 defined by the view definition 251.

After processing step 308, the view renderer 223 repeats further iterations of the loop in step 305 for each view definition 251 such that a view 118 associated with each view definition is thus displayed in a graphical user interface 129. Furthermore, for each view definition that has a corresponding view 118 displayed on the graphical user interface 129, managed object data references 252 from each view definition 251 have been obtained and resolved to identify what managed object data 134 is to be displayed in which particular views 118. After processing step 308 for the final iteration of the loop in step 305 for each view definition 251, processing proceeds to step 309 at the top of FIG. 6.

In FIG. 6 in step 309, the resource management process 121 operates the object data getter 224 to obtain managed object data 134 based upon the managed object data references 252 identified for each view definition 251 (i.e., obtained from each iteration of step 308). In other words, step 309 is another loop that is performed for each managed object data reference 252 for each view 118 displayed on a graphical user interface 129.

Step 310 is an optional step which the resource management process 121 performs when a task selection 116 identifies a resource management function (e.g., a systems administration commend) which needs to be carried out upon any managed resources 150 that correspond to managed object selection 117 prior to the display of managed object data 134 in a view 118 on the graphical user interface 129. In such cases, the object data getter 224 invokes the management function associated with the task selection 116 upon managed object data 134 (e.g., upon one or more managed resources 150) associated with the managed object selections 117 to produce managed object data 134 (FIG. 1, in the management server computer system 130) which is referenced by the managed object data references 252 within the view definition 251. In other words, in step 310, the resource management process 121 first performs any required management functionality upon managed resources 150 that correspond to the managed object selections 117 so that any managed object data 134 produced as a result of the application of such management functions can be displayed within the graphical user interface 129 in the view(s) 118.

Next, in step 312, the object data getter 224 obtains the required managed object data 134 from the management server 140 (FIG. 1) operating on the management server computer system 130.

After processing each iteration of the loop defined by step 309, the object data getter 224 has now obtained (e.g., in the memory system 112) all of the required managed object data 134 that is to be displayed within the view(s) 118 on the graphical user interface 129.

Next, in step 314, the resource management process 121 again operates the view renderer 223 to provide the managed object data 134 to the view 118 displayed on a graphical user interface 129 for viewing by the user.

Finally, in step 315, the view renderer 223 renders the managed object data 134 within the view 118 according to any managed object data style information defined in the data dictionary 123 for the managed object data 134. As discussed above, object definitions 257 that contain the managed object data 134 (or that contain references to such data) can also contain style information or references to styles which indicate how such managed object data 134 is to be displayed within particular views 118 on a graphical user interface 129. In this manner, depending upon which view type 254 is specified by a particular view definition 251, the managed object data 134 referenced (by managed object data references 252) by that view definition 251 can be displayed according to different styles on a view by view basis, or, in another configuration by default are made consistent throughout all views. In this manner, the same object fields will be consistently seen in all areas and in different views.

As an example of how the same managed object data 134 can be displayed differently according to different views 118, consider the example in FIG. 1 in which the managed object data 134 is simply indicated as a series of dots within the view table 1118. Each dot corresponds to the intersection of the volume identity with a specific size for that volume. Within an object definition 257 for this managed object data 134, the data may simply be the numerical sizes in gigabytes or in other size units of the particular volume. However, a style definition associated with this object definition 257 can indicate that when this managed object data 134 is displayed in a table view 118, it is to be shown graphically as a bar of a particular height or color instead of numerically as a number. Other styles can perform transformations of data. As an example, if the view is a text view and the volume size managed object data 134 is to be displayed numerically, a style might define the suffix appended to the data such as "GB" for gigabyte or "TB" for terabyte, depending upon the size of the volume. The style can thus operate a simple function to determine if the size exceeds a certain value then use "TB" instead of "GB" when displaying the managed object data 134. Those skilled in the art will understand that many other types of style definitions can be created which can essentially transform data represented in one manner within an object definition 257 into a graphical representation presented to the user 108 in another manner.

According to the aforementioned processing operations, embodiments of the invention provide the resource management process 121 as a lightweight application which looks to the data dictionary 123 for information on tasks, managed objects and views to be displayed on the graphical user interface 129 to allow a user 108 to manage the managed resources 150 to which this information is related. Using this architecture provided by embodiments of the invention, great flexibility is provided in the design of resource management applications. This is because, referring back to FIG. 1, the view definitions 132 and object definitions 133 within the management server computer system 130 can be markup language documents such as XML documents that define such definitions. Accordingly, if a developer of a managed resource 150 desires that the resource management application 120 of embodiments of the invention should be allowed to manage a newly developed resource 150, the resource developer simply needs to create task, object and view definitions in XML for that resource 150. The task definition can reference what functions can be applied to the new resource 150 and the view definitions can specify how the resource managed object data 134 is to be displayed. Views 118 that are already defined may be used, or new views can be created using XML or visual tools that create XML. These definitions can be incorporated into the view definitions and object definitions documents 132 and 133 and thus the user 108 of the resource management process 121 can now have access to the management functionality provided by the developer of the resource 150 using the resource management process 121 and application 120 of this invention.

Those skilled in the art will understand that there can be many other variations made to the operations of the embodiments explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. In a computer system for managing resources, a method for displaying managed object data associated with managed resources, the method comprising the steps of:

receiving at least one managed object selection and receiving a task selection to apply to the at least one managed object selection;

identifying at least one view definition corresponding to the task selection that defines a view with which to display managed object data related to the at least one managed object selection;

displaying the view corresponding to the at least one view definition on a graphical user interface of the computer system;

obtaining the managed object data related to the at least one managed object selection;

displaying the managed object data related to the at least one managed object selection within the view on the graphical user interface of the computer system;

the method further including the steps of:

retrieving a data dictionary containing a master view definition, task definitions, view definitions and managed object data definitions, the data dictionary further defining, for each task definition, at least one use case that defines a mapping of at least one view definition to a portion of at least one managed object data definition; and displaying the master view definition on the graphical user interface such that a user of the computer system can provide the at least one managed object selection and a task selection that are received in the step of receiving;

wherein the step of identifying at least one view definition corresponding to the task selection comprises the steps of:

selecting a task definition in the data dictionary that corresponds to the task selection; and for each of the at least one object selection, selecting a use case that is associated with the task definition in the data dictionary and that corresponds to the at least one object selection, the use case identifying a view definition defining a view in which to display managed object data related to the at least one managed object selection to which a management function associated with the task selection is applied;

and wherein the data dictionary is a document object model based upon parsing operations performed on a collection of markup language statements that define task definitions, view definitions, and object definitions.

2. The method of claim 1 wherein the step of displaying the view definition comprises the steps of:

for each of the at least one view definition identified in the step of identifying:

i) retrieving a view type from the at least one view definition in the data dictionary, the view type defining a view to be displayed on the graphical user interface of the computer system; and ii) rendering a view corresponding to the view type on the graphical user interface of the computer system.

3. The method of claim 2 wherein the step of rendering a view corresponding to the view type renders the view according to a view style defined in the data dictionary.

4. The method of claim 3 wherein the view style defines a view corresponding to at least one of a map, a tree and a graph.

5. The method of claim 1 wherein the step of obtaining the managed object data comprises the steps of:

consulting the at least one view definition in the data dictionary to identify the managed object data references related to the at least one managed object selection that reference managed object data that is to be displayed in the view definition; and obtaining the managed object data based upon managed object data references.

6. The method of claim 5 wherein the step of obtaining the managed object data includes the step of:

determining if the managed object data is contained in the data dictionary, and if the managed object data is contained in the data dictionary, the managed object data is obtained from the data dictionary, and if the managed object data is not contained in the data dictionary, the managed object data is obtained from a management server that provides the managed object data.

7. The method of claim 5 wherein the step of obtaining the managed object data further comprises the steps of:

invoking a management function associated with the task selection upon managed object data associated with at least one of the at least one managed object selection to produce managed object data which is referenced by the managed object data references defined within the view definition.

8. The method of claims 1 wherein the step of displaying the managed object data comprises the steps of:

providing the view displayed on the graphical user interface of the computer system with the managed object data obtained as a result of the step of obtaining; and rendering the managed object data in the view.

9. The method of claim 8 wherein the step of rendering the managed object data renders the managed object data according to a managed object data style defined in the data dictionary for the managed object data.

10. The method of claim 1 wherein:

the object definitions in the document object model define attributes and data of resources in a storage area network environment;

the task definitions identify resource management functions which may be applied to the resources in the storage area network environment; and wherein the step of obtaining the managed object data includes the step of:

applying a resource management function associated with the task selection upon a resource in the storage area network environment corresponding to the managed object selection to produce managed object data which is referenced by the managed object data references defined within the view definition; and wherein the step of displaying the managed object data displays the managed object data in the graphical user interface to allow a user of the computer system to view results of application of the resource management function on the resources in storage area network environment.

11. A computer system, comprising:

a display;

a memory;

a processor; and an interconnection mechanism coupling the display, the processor and the memory;

wherein the memory is encoded with a resource management application that, when performed on the processor, produces a resource management process that provides a graphical user interface for displaying managed object data associated with managed resources on the display of the computer system by causing the computer system to perform the operations of:

receiving at least one managed object selection and receiving a task selection to apply to the at least one managed object selection;

identifying at least one view definition corresponding to the task selection with which to present, on the display, managed object data related to the at least one managed object selection;

displaying a view on a graphical user interface on the display of the computer system, the view corresponding to the at least one view definition identified in the step of identifying;

obtaining the managed object data related to the at least one managed object selection; and displaying the managed object data related to the at least one managed object selection within the view on the graphical user interface of the computer system;

wherein the resource management process further causes the computer system to perform the operations of:

retrieving, into the memory, a data dictionary containing a master view definition, task definitions, view definitions and managed object data definitions, the data dictionary further defining for each task definition, at least one use case the defines a mapping of at least one view definition to a portion of at least one managed object data definition; and displaying the master view definition on the graphical user interface such that a user of the computer system can provide the at least one managed object selection as a task selection that are received on the step of receiving;

and wherein the resource management process performs the operation of identifying at least one view definition corresponding to the task selection, the resource management application performs the operations of:

selecting a task definition in the data dictionary that corresponds to the task selection;

and for each of the at least one object selection, selecting a use case that is associated with the task definition in the data dictionary and that corresponds to the at least one object selection, the use case identifying a view definition defining a view in which to display managed object data related to the at least one managed object selection to which a management function associated with the task selection is applied;

and wherein the data dictionary in the memory is a document object model based upon parsing operations performed on a collection of markup language statements that defines task definitions, view definitions, and object definitions.

12. The computer system of claim 11 wherein when the resource management process performs the operation of displaying the view definition, the resource management process performs the operations of:

for each of the at least one view definition identified in the operation of identifying:

i) retrieving a view type from the at least one view definition in the data dictionary, the view type defining a view to be displayed on the graphical user interface of the computer system; and ii) rendering a view corresponding to the view type on the graphical user interface of the computer system.

13. The computer system of claim 12 wherein when the resource management process performs the operation of rendering a view corresponding to the view type, the resource management process renders the view according to a view style defined in the data dictionary.

14. The computer system of claim 13 wherein the view style defines a view corresponding to at least one of a map, a tree and a graph.

15. The computer system of claim 11 wherein when the resource management process performs the operation of obtaining the managed object data, the resource management process performs the operations of:

consulting the at least one view definition in the data dictionary to identify the managed object data references related to the at least one managed object selection that reference managed object data that is to be displayed in the view definition; and obtaining the managed object data based upon managed object data references.

16. The computer system of claim 15 wherein when the resource management process performs the operation of obtaining the managed object data, the resource management process performs the operation of:

determining if the managed object data is contained in the data dictionary, and if the managed object data is contained in the data dictionary, the managed object data is obtained from the data dictionary, and if the managed object data is not contained in the data dictionary, the managed object data is obtained from a management server that provides the managed object data.

17. The computer system of claim 15 wherein when the resource management process performs the operation of obtaining the managed object data, the resource management process performs the operation of:

invoking a management function associated with the task selection upon managed object data associated with at least one of the at least one managed object selection to produce managed object data which is referenced by the managed object data references defined within the view definition.

18. The computer system of claim 11 wherein when the resource management process performs the operation of displaying the managed object data, the resource management process performs the operation of:

providing the view displayed on the graphical user interface of the computer system with the managed object data obtained as a result of the step of obtaining; and rendering the managed object data in the view in the graphical user interface on the display of the computer system.

19. The computer system of claim 18 wherein when the resource management process performs the operation of rendering the managed object data, the resource management process renders the managed object data according to a managed object data style defined in the data dictionary for the managed object data.

20. The computer system of claim 11 wherein:

the object definitions in the document object model in the memory define attributes and data associated with resources in a storage area network environment;

the task definitions identify resource management functions which may be applied to the resources in the storage area network environment; and wherein when the resource management process performs the operation of obtaining the managed object data, the resource management process performs the operation of:

applying a resource management function associated with the task selection upon a resource in the storage area network environment corresponding to the managed object selection to produce managed object data which is referenced by the managed object data references defined within the view definition; and wherein when the resource management process performs the operation of displaying the managed object data, the resource management application displays the managed object data in the graphical user interface on the display to allow a user of the computer system to view results of application of the resource management function on the resources in storage area network environment.

* * * * *

UNITED STATES PATENT AND TRADEMARK OFFICE

CERTIFICATE OF CORRECTION

PATENT NO. : 6,978,422 B1
APPLICATION NO. : 09/966878
DATED : December 20, 2005
INVENTOR(S) : Michael Patrick Bushe, Morrie Gasser and David Barta It is certified that error appears in the above-identified patent and that said Letters Patent is hereby corrected as shown below:

On the Cover Page, Column 2, Under Other Publications, line 1, "Steinke, Steve. "Network and Systems Management with XML." http://networkmagazine.com/shared/article/showArticle.jhtml?=8702573. Oct. 10, 1999." should read --"Network and Systems Management with XML." http://networkmagazine.com/shared/article/showArticle.jhtml?articleId=8702573. Oct. 10, 1999--.

Signed and Sealed this

Thirteenth Day of April, 2010

David J. Kappos

*Director of the United States Patent and Trademark Office*